United States Patent

Onoda

[11] Patent Number: 5,923,026
[45] Date of Patent: Jul. 13, 1999

[54] ASSEMBLY STRUCTURE FOR AN IC CARD

[75] Inventor: Shigeo Onoda, Tokyo, Japan

[73] Assignee: Mitsubishi Denki Kabushiki Kaisha, Tokyo, Japan

[21] Appl. No.: 08/848,467

[22] Filed: May 8, 1997

[30] Foreign Application Priority Data

Dec. 11, 1996 [JP] Japan ............................... P08-330671

[51] Int. Cl.$^6$ .................................................. G06K 19/06
[52] U.S. Cl. .......................... 235/492; 235/486; 235/495; 902/26; 361/737
[58] Field of Search .................................... 235/492, 486, 235/487, 495; 902/26; 361/737, 728, 736, 752, 758

[56] References Cited

U.S. PATENT DOCUMENTS

| | | | |
|---|---|---|---|
| 4,138,711 | 2/1979 | Bremenour et al. | 361/737 X |
| 4,226,491 | 10/1980 | Kazama et al. | 361/737 X |
| 4,924,076 | 5/1990 | Kitamura | 235/492 |
| 5,038,250 | 8/1991 | Uenaka et al. | 235/492 X |
| 5,053,613 | 10/1991 | Onoda | 235/492 |
| 5,061,845 | 10/1991 | Pinnavaia | 235/492 |
| 5,086,336 | 2/1992 | Murasawa | 235/492 X |
| 5,242,310 | 9/1993 | Leung | 235/492 X |
| 5,278,445 | 1/1994 | Uemura et al. | 235/492 X |
| 5,476,387 | 12/1995 | Ramey et al. | 235/492 X |
| 5,497,297 | 3/1996 | Kilmer et al. | 235/492 X |
| 5,529,503 | 6/1996 | Kerklaan | 235/492 X |
| 5,541,452 | 7/1996 | Onoda et al. | 235/492 X |
| 5,546,278 | 8/1996 | Bethurum | 235/492 X |
| 5,600,543 | 2/1997 | Sanemitsu | 361/737 |

FOREIGN PATENT DOCUMENTS

| | | |
|---|---|---|
| 4063284 | 5/1992 | Japan . |
| A-7160837 | 6/1995 | Japan . |

*Primary Examiner*—Michael G. Lee

[57] ABSTRACT

Upper and lower exterior members are coupled together without using ultrasonic welding process. Upper and lower metal panels are brought into electrical conduction therebetween with simple construction. In an IC card having an assembly structure wherein an upper exterior member is formed by integrating an upper frame with an upper metal panel, while a lower exterior member is formed by integrating a lower frame with a lower metal panel; and wherein an electric circuit board with specified electronic components incorporated therein and a connector to be connected to the electric circuit board are provided, in which the arrangement of the upper exterior member and the lower exterior member are coupled with each other, by which the IC card is assembled. The IC card upper metal panel and the lower metal panel are partly exposed at coupling portions of the upper exterior member and the lower exterior member with each other, respectively, and a claw portion is provided at an exposed portion of either one of the upper and lower metal panels, while an engaging hole is provided at an exposed portion of the other metal panel, wherein the claw portion is engaged with the engaging hole so that the upper exterior member and the lower exterior member are coupled with each other.

5 Claims, 10 Drawing Sheets

ASSEMBLY STRUCTURE FOR AN IC CARD

BACKGROUND OF THE INVENTION

1. Field of the Invention

The present invention relates to a structure of IC cards.

2. Description of the Prior Art

Conventionally, for so-called IC cards, there has been commonly and widely adopted a structure in which internal components such as an electric circuit board with specified electronic components or the like incorporated therein are arranged within a frame, the upper and lower sides of which arrangement are covered by a pair of metal panels.

It is noted that the term "IC card" herein refers to those which are formed into card-like or flat-plate shape and which are provided with electronic circuits or electric circuits including semiconductor circuits. For example, the IC card is construed as including cards which are called by various other different designations, from PC cards, modem cards, LAN cards or memory cards to electronic cards, and which have similar basic constructions.

As the structure of such IC cards, there has been known one in which the frame serving as the outer frame of the card is divided into upper and lower two divisions, and the upper and lower frames are integrated with upper and lower metal panels, respectively, in which arrangement the upper and lower frames are coupled with each other by ultrasonic welding process, by which the IC card is assembled.

More specifically, as an example is shown in FIGS. 16 to 19, an IC card 101 according to the prior art comprises a frame 102 made of resin and constituting the outer frame of the card main body, an electric circuit board 103 into which specified electronic components or the like 104 have been incorporated, a connector 105 to be attached on one end side of the electric circuit board 103, and a pair of metal panels 107, 108 which cover the upper and lower sides (front and rear) of the card 101 including the electric circuit board 103 and the connector 105. In addition, the connector 105 is designed to obtain electrical connection with equipment in which the IC card 101 is to be used (e.g., personal computers or the like).

The frame 102 made of resin is divided into upper and lower two divisions, thus comprising an upper frame 102U and a lower frame 102L. The upper frame 102U and the upper panel 107 are integrated together to form an upper exterior member 110U, while the lower frame 102L and the lower panel 108 are integrated together to form a lower exterior member 110L. These frames 102U, 102L and metal panels 107, 108 are integrated, respectively, in the molding process of the resin frames 102U, 102L, for example, by the so-called panel-frame integrally molding technique.

Then, after the electric circuit board 103 and the connector 105 connected thereto are interposed between the upper exterior member 110U and the lower exterior member 110L the members 110L, 110U are coupled together, by which the IC card 101 is assembled. In addition, the upper exterior member 110U is illustrated upside down for a better understanding of its structure in FIG. 19, whereas the upper exterior member 110U will be reversed 180° from the illustrated state of FIG. 19, as indicated by one-dot chain line in FIG. 19, and combined with the lower exterior member 110L in the actual assembling process.

In the coupling surface of either one of the upper and lower frames 102U, 102L (the lower frame 102L in this prior-art example), as apparent from FIG. 17, a welding protrusion 111 (welding margin) the cross section of which has been set to specified size and shape is formed so as to, for example, continue along the perimeter of the frame 102L.

Then, the upper and lower exterior members 110U, 110L are combined together so that the welding protrusion 111 and the end face of the upper frame 102U come into contact with each other. In this state, while the contact portion is held pressurized from above and below, ultrasonic vibrations are given to fuse the welding protrusion 111, by which the upper and lower frames 102U, 102L are coupled with each other at their end faces.

With such an arrangement adopted, not only the time-consuming and laborious bonding process can be eliminated, but also a stronger fixation can be attained, compared with the case where metal panels are bonded to the upper and lower sides of an integral-unit frame. Moreover, the fixation width of the frame can be set narrower, so that a large mounting area for electronic components or the like within the IC card can be ensured.

In addition, in the coupling surfaces of the upper and lower frames 102U, 102L, slits 112U, 112L which reach the metal panels 107, 108 are formed, respectively, so as to correspond to each other. Prior to the assembly of the upper and lower exterior members 110U, 110L, for example, annular metallic rings (not shown) are preliminarily fitted to these slits 112U, 112L, by which conduction between the upper and lower metal panels 107, 108 can be obtained in the assembled state. As a result, the electronic components or the like 104 placed on the electric circuit board 103 can be electrically protected from static electricity and the like applied from outside, more effectively.

As a structure designed for improvement in the durability to static electricity by making the upper and lower metal panels conducting with each other as stated above, although other than the type that the frame is divided upper and lower, there is known such a structure as disclosed in Japanese Utility Model Laid-Open Publication No. HEI 4-63284, in which the upper and lower metal panels are subject to a bending process at their side edge portions to form claw portions which are engageable with each other, while the resin frame has vertical through gaps formed at sites corresponding to the claw portions, in which arrangement when the card is assembled. The claw portions of the upper and lower metal panels are engaged with each other within the gaps so that the conduction between the two metal panels can be obtained.

However, in the prior-art IC card 101, since the upper exterior member 110U and the lower exterior member 110L are coupled together by ultrasonic welding, applying ultrasonic vibrations to coupling portions in the welding process would cause the vibration energy to reach the electronic components or the like 104 on the electric circuit board 103, thus giving rise to a possibility that these electronic components or the like 104 may be damaged. To avoid this problem, it is necessary to ensure more than a certain spacing between the upper and lower metal panels 107, 108 and the electronic components or the like 104. This would lead to problems in design, for example that the height of the electronic components or the like 104 is limited responsively.

Also, in the prior-art IC card 101, for obtaining the conduction between the upper and lower metal panels 107, 108 with a view to enhancing the durability to static electricity derived from outside, it would be necessary to provide special parts (e.g., the aforementioned annular metallic rings), and besides to provide, on the upper and lower frames 102U, 102L, the slits 112U, 112L for fitting the special parts. As a result, the number of component parts involved is increased, the molding dies for the frames 102U, 102L become complex, and moreover the number of man-hours for assembly is also increased, as further problems.

SUMMARY OF THE INVENTION

The present invention having been accomplished to solve these and other problems, a principal object of the invention is to provide an IC card which allows upper and lower exterior members to be coupled together without using the ultrasonic welding process, and which allows the upper and lower metal panels to be brought into electrical conduction with each other with simple construction.

In order to achieve the above object, according to a first aspect of the present invention, there is provided an IC card having an assembly structure in which: a frame serving as an outer frame of the card and having been divided into upper and lower two divisions is composed of an upper frame and a lower frame; an upper exterior member is formed by integrating the upper frame with an upper metal panel that covers upper side of the card, while a lower exterior member is formed by integrating the lower frame with a lower metal panel that covers lower side of the card; and that an electric circuit board with specified electronic components or the like incorporated therein and a connector to be connected to one end side of the electric circuit board are provided between the upper and lower exterior members, in which the arrangement the upper exterior member and the lower exterior member are coupled with each other, by which the IC card is assembled, the IC card characterized in that: the upper metal panel and the lower metal panel are partly exposed at coupling portions of the upper exterior member and the lower exterior member with each other, respectively, and a claw portion is provided at the exposed portion of either one of the upper and lower metal panels, while an engaged portion engageable with the claw portion is provided at the exposed portion of the other metal panel, wherein the claw portion is engaged with the engaged portion so that the upper exterior member and the lower exterior member are coupled with each other.

Also, according to a second aspect of the present invention, there is provided an IC card as defined in the first aspect, wherein a recess is formed in either one of a coupling surface of the upper frame or a coupling surface of the lower frame, while a protrusion fittable with the recess is formed in the other coupling surface, and wherein when the upper exterior member and the lower exterior member are coupled with each other, the recess and the protrusion are fitted to each other.

Further, according to a third aspect of the present invention, there is provided an IC card as defined in the second aspect, wherein a skeleton member formed from part of the metal panels in a protruding shape is buried within the recess.

Still further, according to a fourth aspect of the present invention, there is provided an IC card as defined in the second or third aspect, wherein the recess and the protrusion are formed into rectangular or elliptical shape, as viewed from top.

Still further, according to a fifth aspect of the present invention, there is provided an IC card as defined in any one of the first to fourth aspects, wherein the claw portion is formed by bending an end of the exposed portion of the one metal panel.

Still further, according to a sixth aspect of the present invention, there is provided an IC card as defined in any one of the first to fourth aspects, wherein the claw portion engages with the engaged portion perpendicularly to the exposed portion of the other metal panel in which the engaged portion is provided.

Still further, according to a seventh aspect of the present invention, there is provided an IC card as defined in the sixth aspect, wherein the claw portion is located within the same plane as the exposed portion of the one metal panel in which the claw portion is provided. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings wherein.

DESCRIPTION OF PREFERRED EMBODIMENTS

The preferred embodiments of the present invention are described below with reference to the accompanying figures.

Embodiment 1

Figure 1:
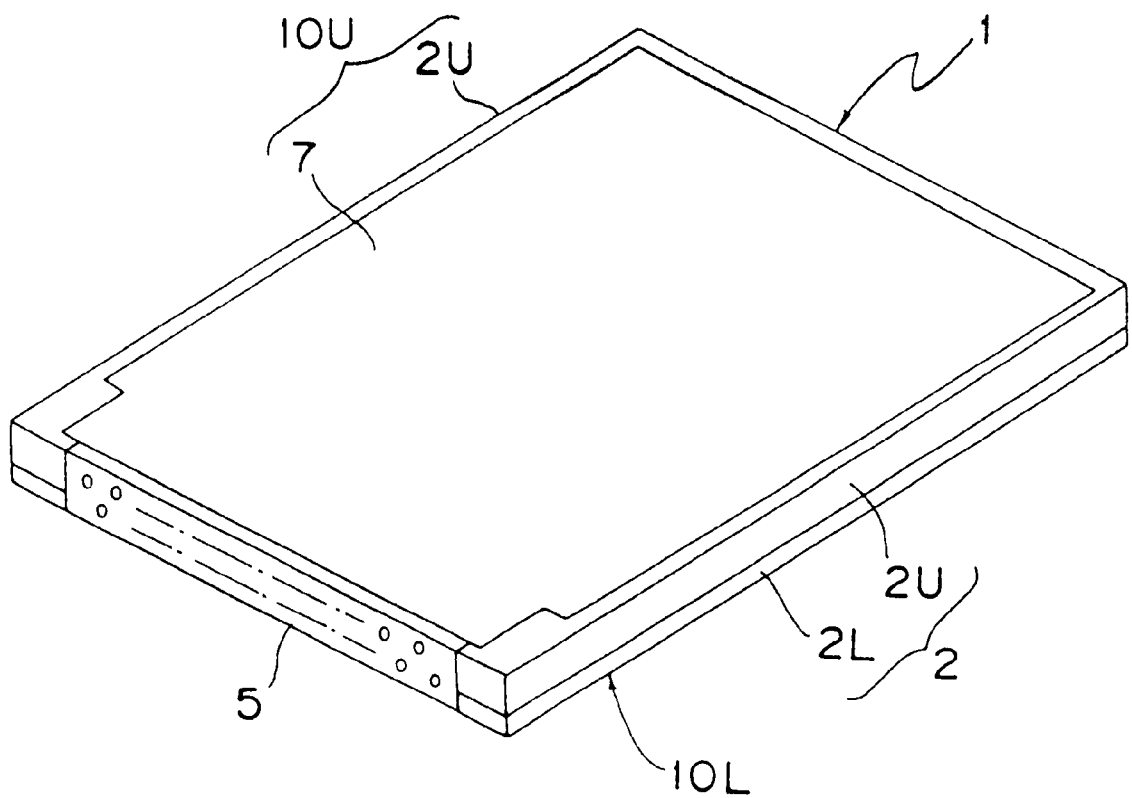
FIG. 1 is an overall perspective view of an IC card according to Embodiment 1 of the present invention.
Figure 2:
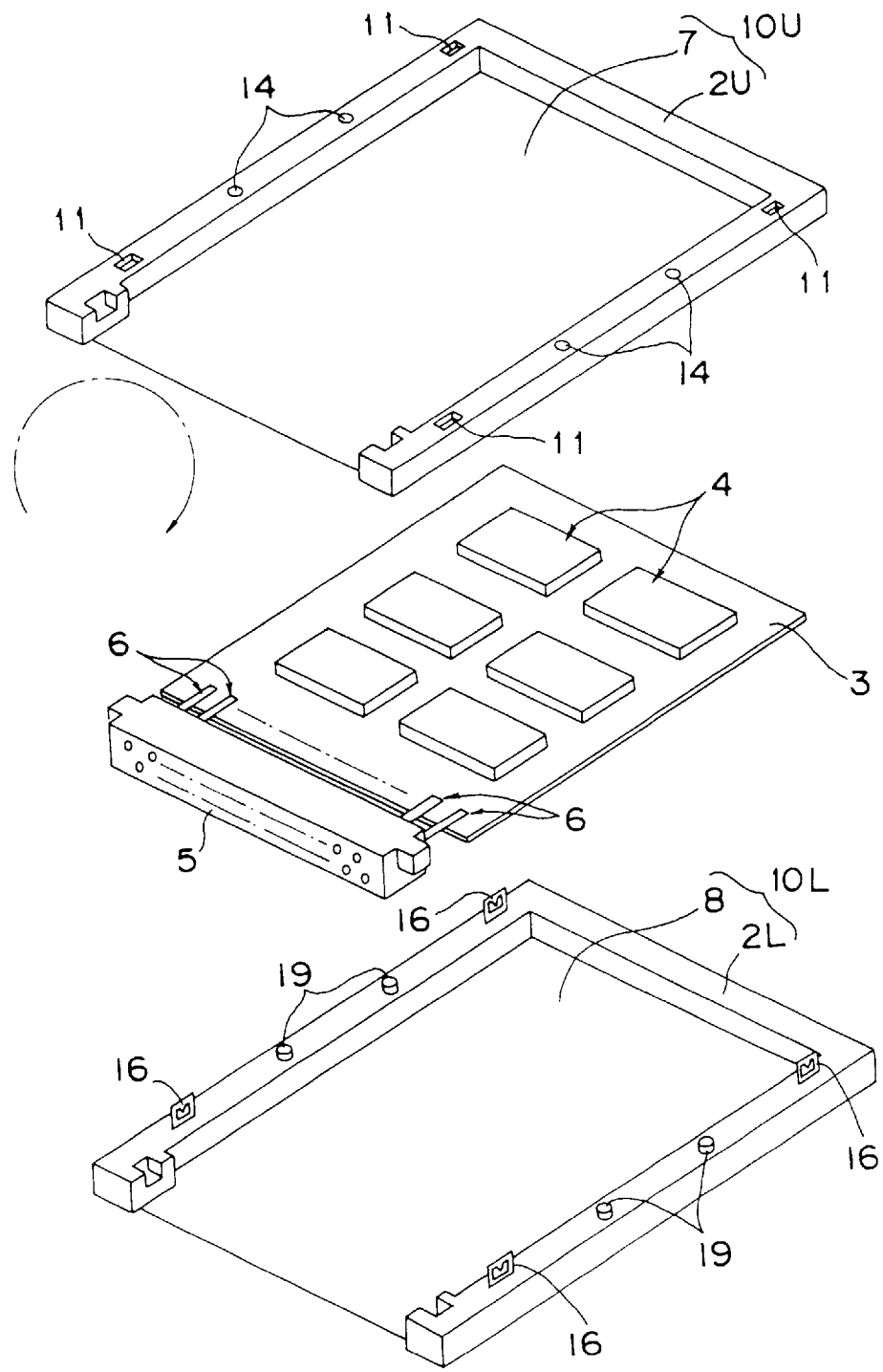
FIG. 2 is an exploded perspective view of the IC card.

Hereinbelow, embodiments of the present invention are described in detail with reference to the accompanying drawings. FIG. 1 is an overall perspective view of an IC card 1 according to the present embodiment. FIG. 2 is an exploded perspective view of the IC card 1. As shown in these figures, the IC card 1 comprises a frame 2 made of resin and constituting the outer frame of the card main body, an electric circuit board 3 into which specified electronic components or the like 4 have been incorporated, a connector 5 to be attached on one end side of the electric circuit board 3, and a pair of metal panels 7, 8 which cover the upper and lower sides (front and rear) of the card 1 including the electric circuit board 3 and the connector 5.

The connector 5, which is located on one side surface (front-side surface) of the IC card, is designed to perform signal transmission and reception as it is connected to equipment for use of the IC card 1 (e.g., personal computers or the like). The electronic components or the like 4 and the connector 5 are connected electrically and mechanically to the electric circuit board 3, for example, by a soldering process or the like. In addition, the electric circuit board 3 and the electronic components or the like 4 are electrically and mechanically connected with each other via a multiplicity of metal conductors 6.

In this embodiment, the frame 2 made of resin is divided into upper and lower two divisions, comprising an upper frame 2U and lower frame 2L. The upper frame 2U and a upper panel 7 that covers the upper side of the card are integrated together to form an upper exterior member 10U, while the lower frame 2L and the lower panel 8 that covers the lower side of the card are integrated together to form a lower exterior member 10L. These frames 2U, 2L and metal panels 7, 8 are integrated, respectively, in the molding process of the resin frames 2U, 2L by the so-called panel-frame integrally molding process. More specifically, after the metal panels 7, 8 press-molded into specified shape are set in the molding dies for the frames 2U, 2L, molten resin is fed into the dies and molded into the frames 2U, 2L. In this way, the exterior members 10U, 10L in which the frames 2U, 2L and the panels 7, 8 have been integrated are obtained.

Instead of this process, frames previously molded into specified shape and metal panels press-molded may be integrated together by fixing them with each other by fitting or other mechanical process or bonding process.

Then, after the electric circuit board 3 and the connector 5 connected thereto are provided between the upper exterior member 10U and the lower exterior member 10L, the members 10U, 10L are coupled together, by which the IC card 1 is assembled. In addition, the upper exterior member 10U is illustrated upside down for a better understanding of its structure in FIG. 2, whereas the upper exterior member 10U will be reversed 180° from the illustrated state of FIG. 2, as indicated by one-dot chain line in FIG. 2, and combined with the lower exterior member 10L in the actual assembling process.

In this embodiment, in the assembling process of the IC card 1, the upper exterior member 10U and the lower exterior member 10L are coupled with each other by a mechanical fitting process of the upper and lower metal panels 7, 8 with each other, in place of the conventional ultrasonic welding process.

Figure 3:
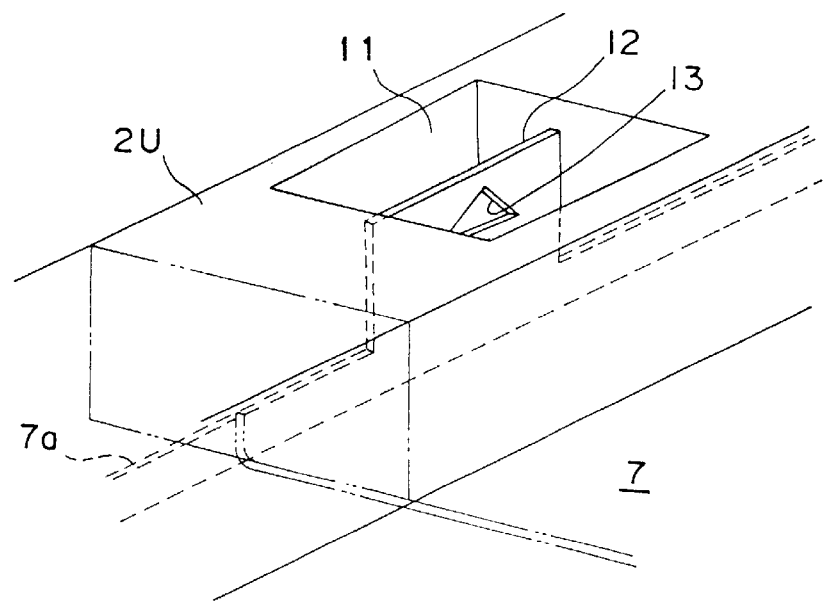
FIG. 3 is a perspective view showing under magnification an exposed portion of the upper metal panel of the IC card.

Below described is the coupling structure of the upper and lower exterior members 10U, 10L with each other. A plurality (four in this embodiment) of recesses 11 (first recesses) of specified depth are formed in the coupling surface of the frame 2U (upper frame) of the upper exterior member 10U, where part of the upper panel 7 is exposed within each of the first recesses 11 as shown in detail in FIG. 3. At longitudinal side edge portions of the upper panel 7, bent portions 7a which are L-shaped in cross section are formed by bending the panel material approximately 90°, respectively, while portions protruded from the bent portions 7a by a specified height are provided at a plurality of places (e.g., two places on one side in this embodiment) along the longitudinal direction of the bent portions 7a, where end-side part of the protrusions is exposed into the recess 11 to form an exposed portion 12 (upper exposed portion). Besides, a hole 13 (fitting hole) of, for example, triangular shape is formed in the upper exposed portion 12.

Figure 7:
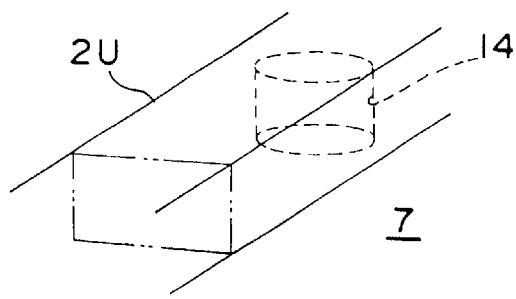
FIG. 7 is a perspective view showing under magnification a second recess of the upper frame of the IC card.

More preferably, a plurality (four in this embodiment) of recesses 14 (second recesses) of specified depth are formed in the coupling surface of the upper frame 2U. As well seen from FIG. 7, these second recesses 14 are perimetrically circular shaped.

Part of the lower panel 8 is exposed at sites corresponding to the upper exposed portions 12, respectively, in the coupling surface of the frame 2L (lower frame) of the lower exterior member 10L. At longitudinal side edge portions of the lower panel 8, bent portions 8a which are L-shaped in cross section are formed by bending the panel material approximately 90°, respectively, while portions protruded from the bent portions 8a by a specified height are provided at a plurality of places (e.g., two places on one side in this embodiment) along the longitudinal direction of the bent portions 8a, where end-side part of the protrusions is exposed from the coupling surface of the lower frame 2L to form an exposed portion 16 (lower exposed portion). Besides, as shown in detail in FIG. 4, a claw portion 18 engageable with the fitting hole 13 of the upper exposed portion 12 is formed in the lower exposed portion 16. This claw portion 18 extends so as to warp in a downward-opening shape as slightly inclined from the plane containing a base 17 of the lower exposed portion 16, and more preferably, at least one side portion of of the claw portion 18 is tapered at a specified angle. In this embodiment, the claw portion 18 is formed into a triangular shape, so that both side portions thereof are tapered.

Figure 8:
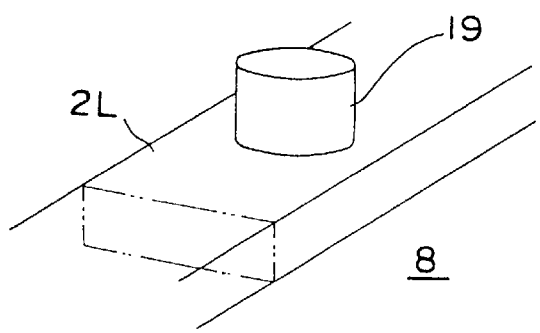
FIG. 8 is a perspective view showing under magnification a protrusion of the lower frame of the IC card.

Also, more preferably, protrusions 19 of specified height are provided in the coupling surface of the lower frame 2L at sites corresponding to the second recesses 14 of the upper frame 2U. As well understood from FIG. 8, this protrusion 19 is formed in a cylindrical shape, and so dimensioned as to fit to the second recess 13 with a small clearance or tightening margin.

With the above arrangement, in the final assembling process of the IC card 1, the electric circuit board 3 and the connector 5 coupled with each other are placed between the upper exterior member 10U and the lower exterior member 10L, and then in this state, the two exterior members 10U, 10L are coupled together. For this operation, the second recesses 14 of the upper frame 2U are aligned with their corresponding protrusions 19 of the lower frame 2L. When this is done, the upper exposed portions 12 and their corresponding lower exposed portions 16 are to be located to such positions that the upper exposed portions 12 and the corresponding lower exposed portions 16 are engageable with each other.

Figure 9:
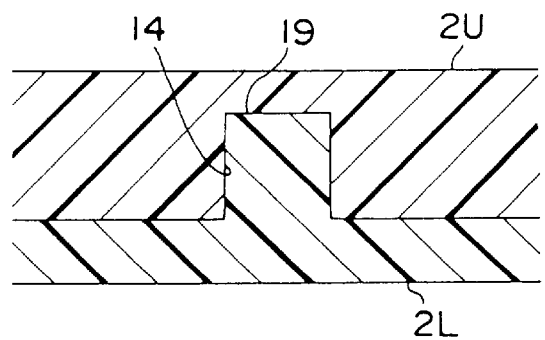
FIG. 9 is an explanatory longitudinal sectional view of the IC card showing the fitted state of the second recess and the protrusion.

Then, the frames 2U, 2L of the upper and lower exterior members 10U, 10L combined together in this way are pressurized from above and below. As a result, as shown in FIG. 9, the second recesses 14 of the upper frame 2U and their corresponding protrusions 19 of the lower frame 2L are fitted with each other with a small clearance or tightening margin. Also, as shown in FIGS. 5 and 6, the fitting holes 13 of the upper exposed portions 12 and the claw portions 18 of the lower exposed portions 16 are engaged with each other.

In this connection, more preferably, prior to the engagement of the claw portions 18 with their engaged portions, the fitting operation of the second recesses 14 with the protrusions 19 will be started, where the upper and lower frame 2U, 2L are positioned by these second recesses 14 and protrusions 19 before the fitting operation of the claw portions 18 with their engaged portions is completed. This allows a more secure, higher-precision positioning to be attained.

Figure 5:
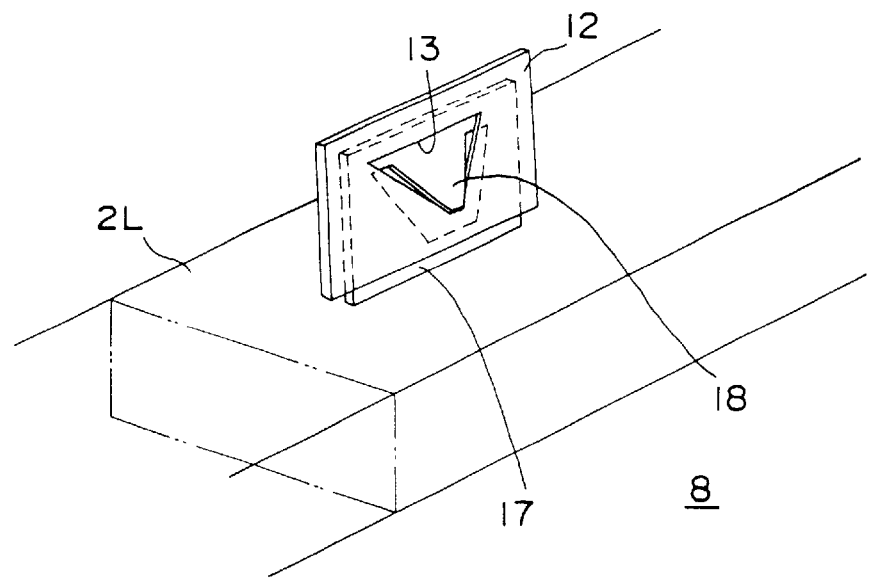
FIG. 5 is a perspective view for explaining the engaged state of the claw portions and an engaging hole in the IC card.
Figure 6:
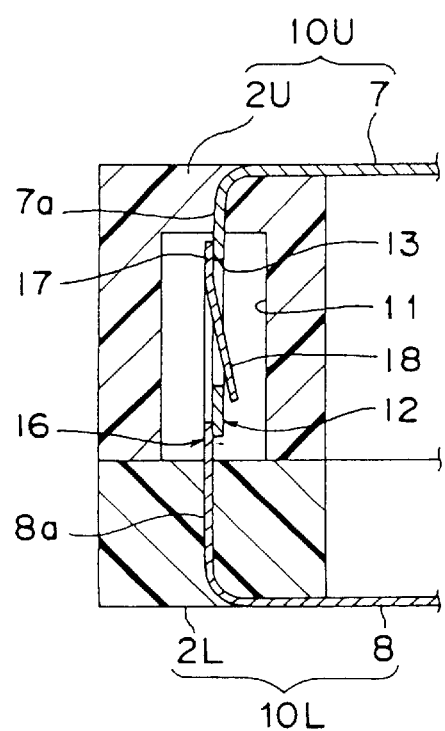
FIG. 6 is an explanatory longitudinal sectional view of the IC card showing the engaged state of the claw portions and the engaging hole.

In addition, FIG. 5 is presented for explaining the fitting state between the claw portion 18 and the fitting hole 13, where the upper exterior member 10U is depicted with the members other than the upper exposed portion 12 omitted.

The fitting between the fitting hole 13 and the claw portion 18 is carried out by the upper exposed portion 12 relatively moving along the lower exposed portion 16 against elastic force due to the aforementioned "warp" of the claw portion 18, and by a lower end portion of the fitting hole 13 going beyond a lower end portion of the claw portion 18 until the two members are engaged with each other. After this engagement, the claw portion 18 itself that has been warped in a downward-opening shape as mentioned before will be stopped from turning back, so that the upper exposed portion 12 will never easily fall off from the claw portion 18.

Also, since the side portion of the claw portion 18 is tapered at a specified angle as described above, this side portion of the claw portion 18 is permitted to slide in combination with the inner perimeter of the triangular fitting hole 13, relative to each other. Therefore, the claw portion 18 and the fitting hole 13 can be securely engaged with each other by absorbing small manufacturing errors in their shape and dimension or relative positions.

Further, a dimensional relation between the thickness of the upper frame 2U and the height of the lower exposed portion 16 is so set that the lower exposed portions 16 can be accommodated in the upper frame 2U (i.e., in the first recesses 11 of the upper frame 2U) without difficulties in the state that the upper and lower exterior members 10U, 10L have been coupled together as seen above.

As described above, according to the present embodiment, parts of the upper metal panel 7 and the lower metal panel 8 are exposed at connecting portions between the upper exterior member 10U and the lower exterior member 10L, respectively, where the claw portions 18 are provided at either one side of them (e.g., the lower side in this embodiment) while the fitting holes 13 engageable with the claw portions 18 are provided at the exposed portions 12 on the other side (e.g., the upper side in this embodiment), so that the upper exterior member 10U and the lower exterior member 10L will be coupled with each other by fitting the claw portions 18 to the fitting holes 13.

Therefore, the upper and lower exterior members 10U, 10L can be coupled with each other without using the ultrasonic welding process. Accordingly, the electronic components or the like 4 on the electric circuit board 3 accommodated in these exterior members 10U, 10L will never be damaged during the coupling process, nor will the height of the electronic components or the like 4 be particularly limited for avoiding such damage, as would be involved in the ultrasonic welding process.

Furthermore, since parts of the upper and lower metal panels 7, 8 (exposed portions 12, 16) are engaged with each other, it is no longer necessary to use special component parts (e.g., the aforementioned annular metallic rings) for making the upper and lower metal panel 7, 8 for enhancing the durability to static electricity derived from outside, as would be involved in the prior art, so that any increase in the number of component parts and the number of man-hours for assembly can be suppressed. Thus, improvement in the durability to static electricity can be attained with relatively simple construction.

Still, the second recesses 14 (second recesses) are formed in either one of the coupling surface of the upper frame 2U or the coupling surface of the lower frame 2L (the coupling surface of the upper frame 2U in this embodiment), while the protrusions 19 engageable with the second recesses 14 are formed in the other side (the coupling surface of the lower frame 2L in this embodiment), in which arrangement the second recesses 14 will be engaged with the protrusions 19 when the upper exterior member 10U and the lower exterior member 10L are coupled with each other. Therefore, for the process that the upper exterior member 10U and the lower exterior member 10L are coupled with each other, it is enabled to obtain not only the coupling force by the engagement of the exposed portions 12, 16 of the upper and lower metal panels 7, 8 with each other, but also the coupling force by the fitting of the second recesses 14 with the protrusions 19. Thus, the two exterior members 10U, 10L can be coupled with each other, more firmly.

Embodiment 2

Next, various types of modifications of the IC card according to the present invention are described. In the following description, components identical to those shown in FIGS. 1 to 9 are designated by like reference numerals and their further description is omitted.

Figure 10:
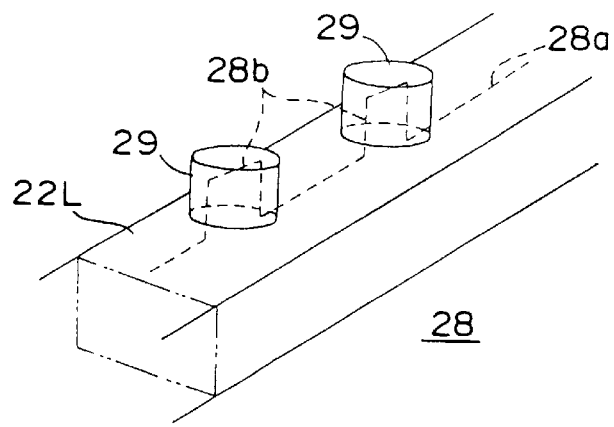
FIG. 10 is a perspective view showing protrusions of the lower frame according to Embodiment 2.
Figure 11:
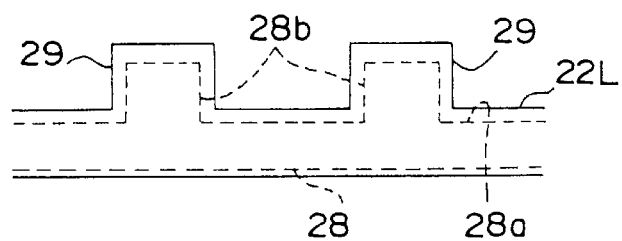
FIG. 11 is an explanatory side view of the protrusions according to Embodiment 2.

FIGS. 10 and 11 show a modification of the protrusion 19 provided in a frame (the lower frame 2L in the foregoing embodiment). As shown in these figures, modification, a skeleton member portion 28b provided by forming part of a metal panel (e.g., lower side panel) 28 into a protruding shape is buried in protrusions 29 provided in a frame (e.g., lower frame) 22L. This skeleton member portion 28b is formed by projecting part of the panel at sites thereof corresponding to the protrusions 29 by a specified height in a bent portion 28a formed at an edge portion along the longitudinal direction of the lower panel 28.

As shown above, according to this modification, the protrusions 29 are reinforced by the skeleton member portion 28b. Thus, the strength and rigidity of the protrusions 29 can be enhanced with a simple construction exploiting part of the metal panel 28.

Embodiment 3

Figure 12:
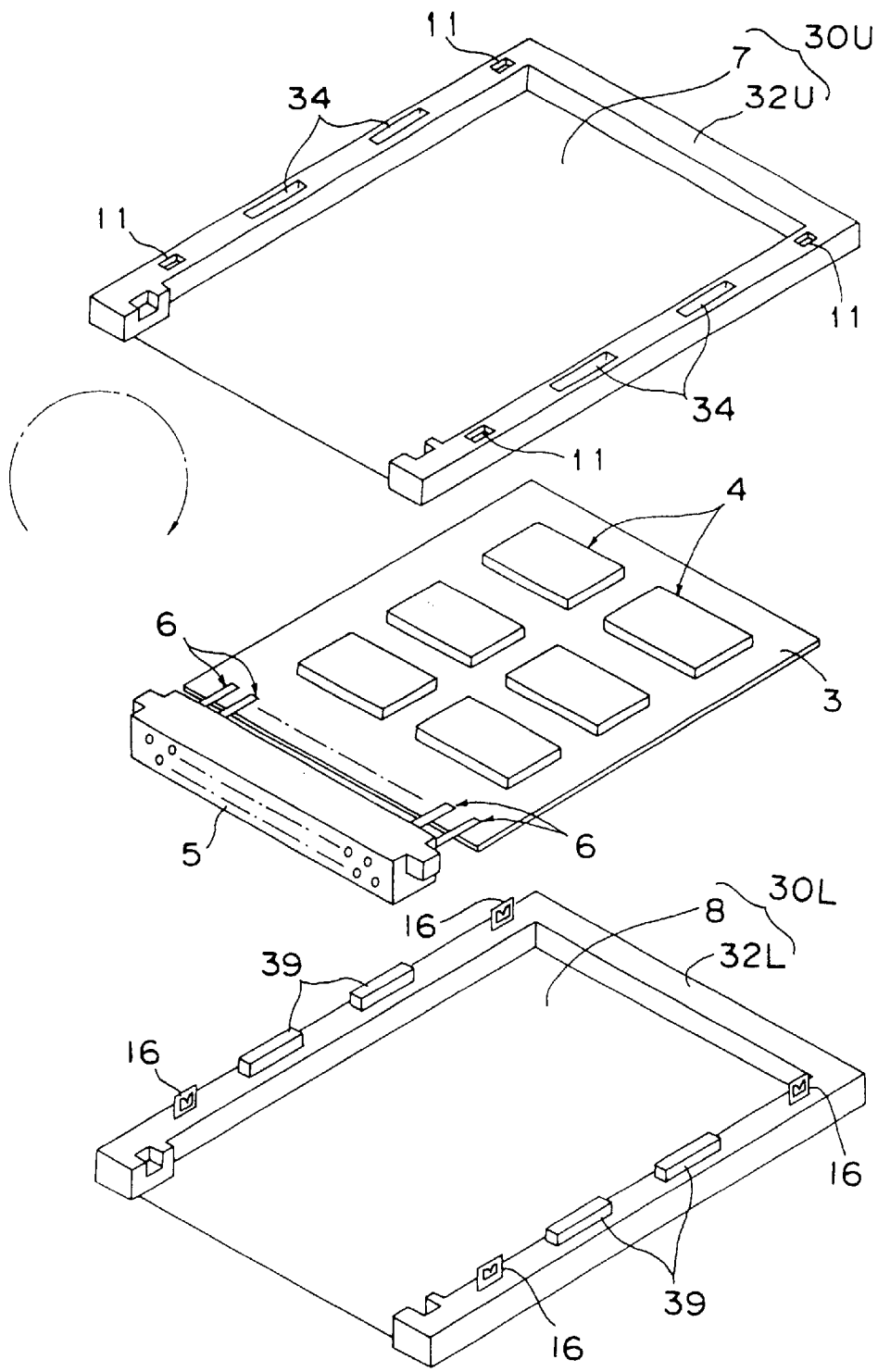
FIG. 12 is an exploded perspective view of the IC card showing second recesses and protrusions according to Embodiment 3.

FIG. 12 shows a modification of the protrusions provided in the coupling surfaces of the upper and lower frames as well as recesses (second recesses) to be fitted thereto. In this modification, the second recesses 34 provided in the coupling surface of an upper frame 32U and the protrusions 39 provided in the coupling surface of the lower frame 32L are formed into rectangular shape (more preferably, right-angled oblong), as viewed from the top.

Because the frames 32U, 32L are limited in width, the arrangement that the second recesses 34 and the protrusions 39 are formed into right-angled, as viewed from the top, in the above way allows a larger area of the fitting portions to be ensured, as compared with cases where those are formed into circular shape, as viewed from the top, as in the Embodiments shown in FIGS. 1 to 9. Thus, the coupling force between an upper exterior member 30U and a lower exterior member 30L can be further enhanced. In addition, the second recesses 34 and the protrusions 39 may also be formed into circular oblong shape, as viewed from the top, instead of rectangular shape as shown above.

Embodiment 4

Figure 13:
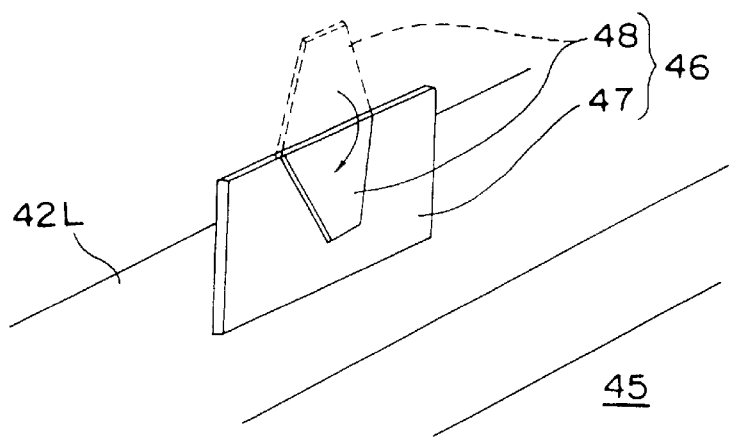
FIG. 13 is a perspective view showing a claw portion according to Embodiment 4.

FIG. 13 shows a modification of the claw portions to be formed at exposed portions of either one of the upper and lower metal panels. As shown by broken lines in this figure, in this modification, an exposed portion 46 of a metal panel 45 (e.g., lower panel) in which the claw portions are to be provided comprises a base 47 of, for example, rectangular shape, and an extension portion 48 formed by being integrally extended from a terminal end of the base 47. This extension portion 48 is located within the same plane as the base 47 is before the metal panel 45 is integrated with a frame 42L (lower frame), so that the lower exposed portion 46 is formed flat on the whole.

Then, the lower panel 45 is integrated with the lower frame 42L in the molding process of the frame 42L made of resin by the aforementioned panel-frame integral molding process. After the completion of this integration, as indicated by solid line in FIG. 13, the claw portions 48 engageable with the engaging holes 13 (e.g., see FIGS. 3, 5 and 6) formed in the upper exposed portions 12 are formed by bending the extension portions 48.

In this modification, as described above, at the time point when the lower panel 45 is integrated with the frame 42L (lower frame), the extension portions 48 forming the claw portions are located within the same plane as the base 47 is, so that the lower exposed portions 46 are maintained flat on the whole. Therefore, in the panel-frame integrating molding process that the lower panel 45 is integrally formed in the molding of the lower frame 42L, after the setting of the lower panel 45 to one molding die (not shown) for the lower frame 42L, the mold closure in the process of forming a molding cavity by closing the other molding (not shown) can be carried out very easily. Further, made release after the molding is also easy.

Figure 4:
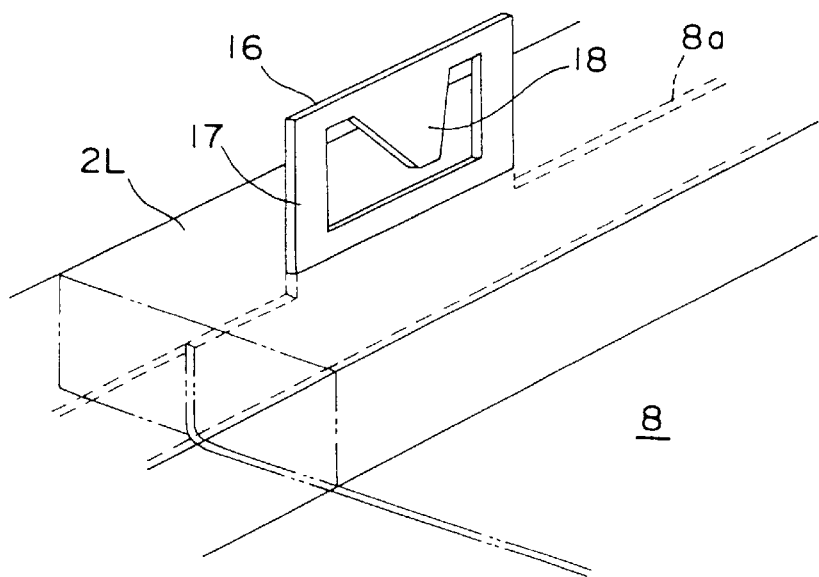
FIG. 4 is a perspective view showing under magnification an exposed portion of the lower metal panel of the IC card.

In contrast to this, when the claw portions 18 have been warped so as not to be located on the same plane as the base 17 as in the lower exposed FIG. 4 to shown in FIGS. 4 to 6, it is generally difficult to carry out the mold closure without causing any resin leakage in the molding process (during the filling of molten resin into the molding cavity). Moreover, it is also difficult to release the closed molding dies.

Consequently, in this modification, since the claw portions 48 are formed by bending the extension portion 48 located at an end of the lower exposed portion 46 of the lower panel 45, the arrangement that the metal panel 45 and the frame 42L are integrated together prior to the bending and thereafter the extension portion 48 is bent makes it possible to eliminate any adverse effects of the presence of the bent portions of the claw portions onto the integrating process of the metal panel 45 and the lower frame 42L. Thus, this integrating process can be achieved more easily and securely.

In this modification, the metal panel 45 and the lower frame 42L have been integrated by the so-called panel-frame integral molding process. However, without being limited to such cases, the integrating process may also be achieved with simplicity in the case, for example, where a frame previously molded into a specified shape and a press-molded metal panel are integrated by fitting or other mechanical process, by bending the extension portion located at an end of the exposed portion of the panel to provide the claw portions and by integrating the metal panel and the frame together in the state prior to the bending.

Embodiment 5

Figure 14:
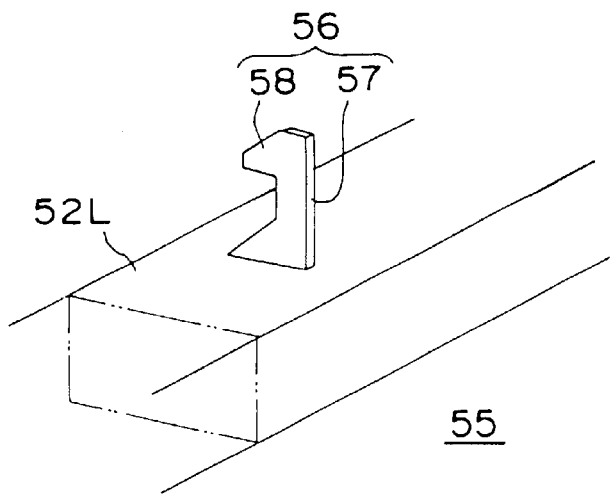
FIG. 14 is a perspective view showing a claw portion according to Embodiment 5.
Figure 15:
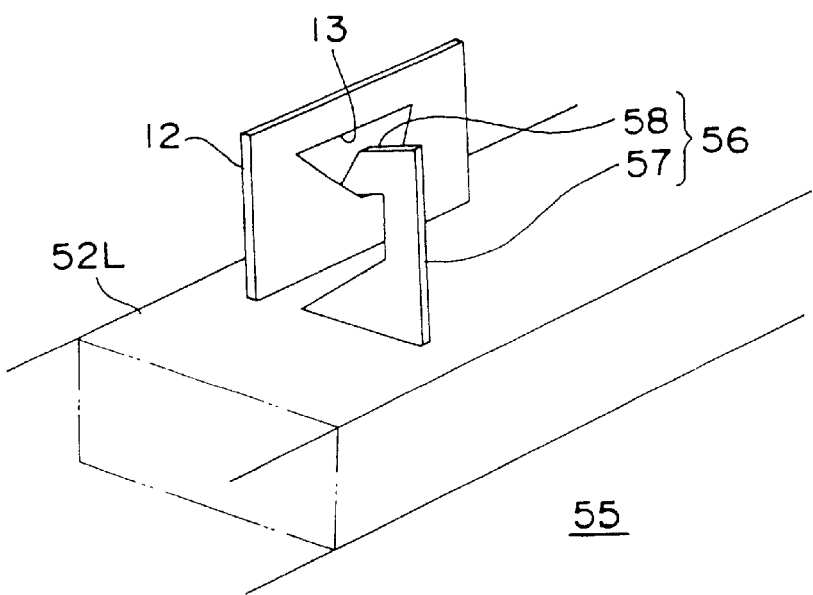
FIG. 15 is a perspective view showing the engaged state of the claw portion and the engaging hole according to Embodiment 5.
Figure 16:
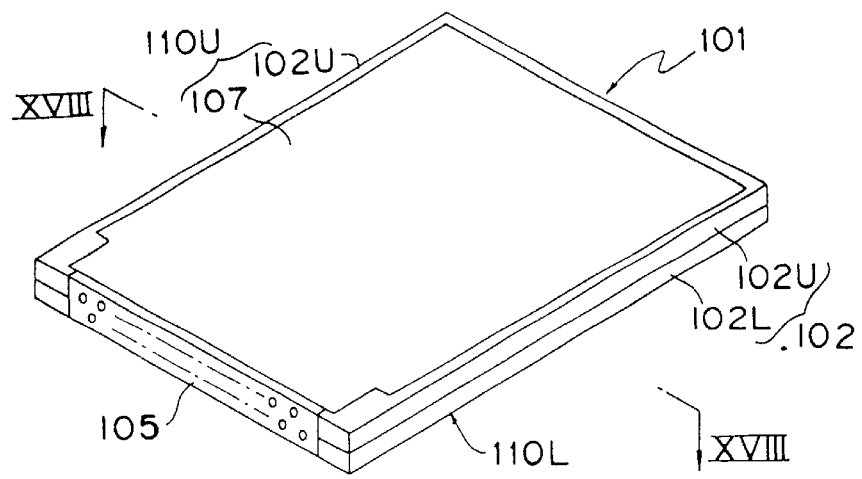
FIG. 16 is an overall perspective view of an IC card according to the prior art.
Figure 17:
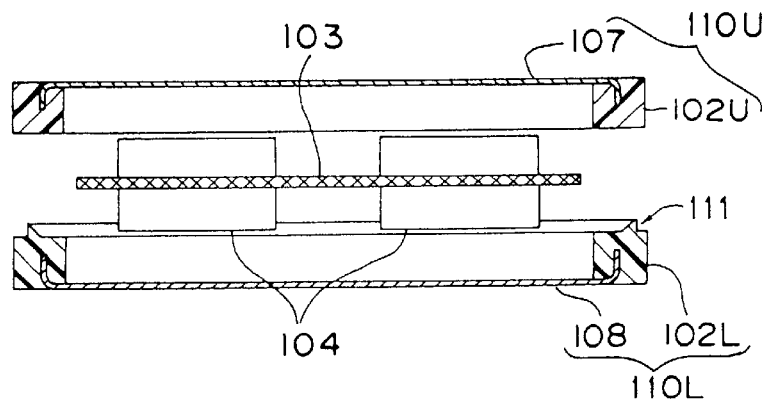
FIG. 17 is an explanatory longitudinal sectional view showing the state prior to the assembly of the IC card according to the prior art.
Figure 18:
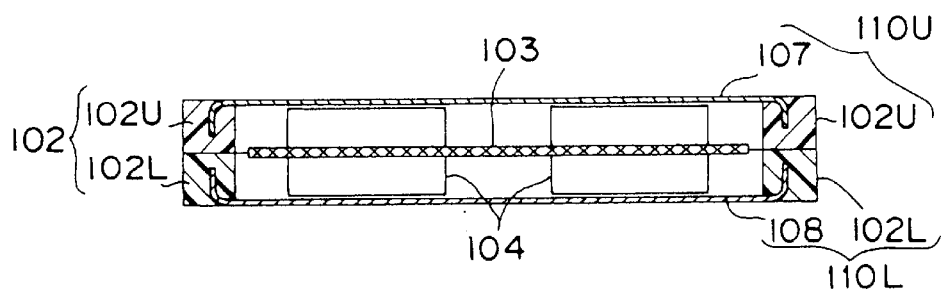
FIG. 18 is an explanatory longitudinal sectional view taken along the line XVIII—XVIII of FIG. 16.
Figure 19:
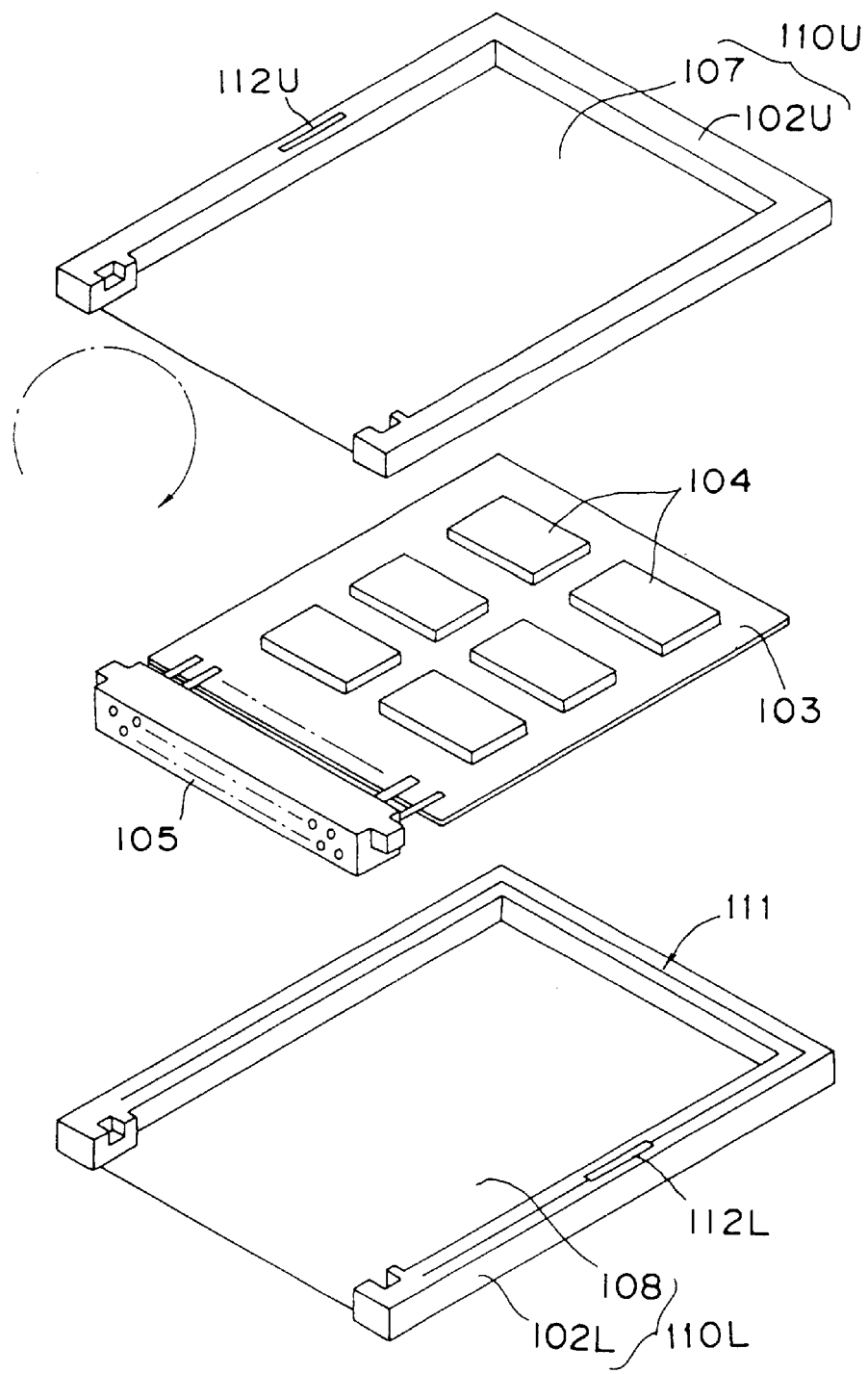
FIG. 19 is an exploded perspective view of the IC card according to the prior art.

FIGS. 14 and 15 show another modification of the claw portions. In this modification, an exposed portion 56 (lower exposed portion) having a claw portion 58 is formed by being twisted approximately 90° from the bent portion (not shown) provided at an edge portion along the longitudinal direction of a metal panel 55 (lower panel). The claw portion 58, which is located within the same plane as a base 57 of the exposed portion 56, will be engaged with the engaging hole 13 of the upper exposed portion 12, perpendicularly to the upper exposed portion 12. Thus, a more secure engaged state can be obtained.

In this case, the claw portion 58, which is located within the same plane as the exposed portion 56 of the lower panel 55 (i.e., as the base 57 of the exposed portion 56) in which the claw portion 58 is provided, does not need to be further bent with respect to the exposed portion 56. Thus, the bending machining process of the claw portion 58 can be prevented from becoming more complex.

In the foregoing embodiments, claw portions have been provided at exposed portions of the metal panel of the lower exterior member while engaged portions (engaging holes) are provided at exposed portions of the metal panel of the upper exterior member. However, the present invention being not limited to such upper-and-lower relation, the upper-and-lower relation can be reversed without no problem. Like this, the present invention is not limited to the foregoing embodiments, and may be modified in various ways or subjected to design changes without departing from the gist of the invention.

As described hereinabove, according to a first aspect of the invention, in an IC card which is to be assembled by coupling together an upper exterior member, which is formed by integrating an upper frame with an upper metal panel, and a lower exterior member, which is formed by integrating a lower frame with a lower metal panel, the upper metal panel and the lower metal panel are partly exposed at coupling portions of the upper exterior member and the lower exterior member with each other, respectively, and a claw portion is provided at an exposed portion of either one of the upper and lower metal panels, while an engaged portion engageable with the claw portion is provided at an exposed portion of the other metal panel, in which arrangement the claw portion is engaged with the engaged portion so that the upper exterior member and the lower exterior member are coupled with each other. As a result, the upper and lower exterior members can be coupled together without using the ultrasonic welding process. Therefore, the electronic components or the like on the electric circuit board accommodated in these exterior members will never be damaged during the coupling process, nor will the height of the electronic components or the like be particularly limited for avoiding such damage, as would be involved in the ultrasonic welding process.

Furthermore, since parts (exposed portions) of the upper and lower metal panels are engaged with each other, it is no longer necessary to use any special parts (e.g., the aforementioned annular metallic rings), as in the prior art, for bringing the upper and lower metal panels into electrical conduction therebetween for enhancing the durability to static electricity derived from outside. Thus, increases in the number of component parts and the number of man-hours for assembly can be suppressed. Consequently, improvement in the durability to static electricity can be achieved with relatively simple construction.

According to a second aspect of the invention, basically, the first aspect of the same effects as in the invention can be exerted. In particular, the claw portion is formed by bending an end of the exposed portion of the one metal panel. Therefore, by integrating the pertinent metal panel with its corresponding frame prior to the bending process and by thereafter effecting the bending process, there can be eliminated any adverse effects of the presence of the bent portion of the claw portion onto the integrating process of the metal panel and the frame. Thus, this integrating process can be achieved more easily and securely.

According to a third aspect of the invention, basically, the first aspect of the same effects as in the invention can be exerted. In particular, the claw portion engages with the engaged portion perpendicularly to the exposed portion of the other metal panel in which the engaged portion is provided. Therefore, a more reliable engagement state can be obtained.

According to the fourth aspect of the invention, basically, the third aspect of the same effects as in the invention can be exerted. In particular, the claw portion is located within the same plane as the exposed portion of the one metal panel in which the claw portion is provided is. Therefore, it is unnecessary to further bend the claw portion against the exposed portion. Thus, the bending machining process of the claw portion can be prevented from becoming more complex.

According to the fifth aspect of the invention, basically, the fifth aspect of the same effects as in the invention can be exerted. Still, moreover, a recess is formed in either one of a coupling surface of the upper frame or a coupling surface of the lower frame, while a protrusion fittable with the recess is formed in the other coupling surface, in which arrangement when the upper exterior member and the lower exterior member are coupled with each other, the recess and the protrusion are fitted to each other. Therefore, in the process of coupling the upper exterior member and the lower exterior member together, it is enabled to obtain not only a coupling force by the engagement of the exposed portions of the upper and lower metal panels with each other, but also another coupling force by the fitting of the recess and protrusion with each other. Thus, the two exterior members can be coupled with each other, more firmly.

According to the sixth aspect of the invention, basically, the fifth aspect of the same effects as in the invention can be exerted. In particular, the recess and the protrusion are formed into rectangular or elliptical shape, as viewed from top. Therefore, for providing the recess and the protrusion in the coupling surfaces of the frames that are limited in width, a larger area can be ensured for the fitting portion, as compared with the case of circular recesses and protrusions, as viewed from the top, so that the coupling force between the upper exterior member and the lower exterior member can be further enhanced.

According to the seventh aspect of the invention, basically, the fifth aspect of the same effects as in the invention can be exerted. In particular, the claw portion is formed by bending an end of the exposed portion of the one metal panel. Therefore, by integrating the pertinent metal panel with its corresponding frame prior to the bending process and by thereafter effecting the bending process, there can be eliminated any adverse effects of the presence of the bent portion of the claw portion onto the integrating process of the metal panel and the frame. Thus, this integrating process can be achieved more easily and securely.

According to the eighth aspect of the invention, basically, the fifth aspect of the same effects as in the invention can be exerted. In particular, the claw portion engages with the engaged portion perpendicularly to the exposed portion of the other metal panel in which the engaged portion is provided. Therefore, a more reliable engagement state can be obtained.

According to the ninth aspect of the invention, basically, the eighth aspect of the same effects as in the invention can be exerted. In particular, the claw portion is located within the same plane as the exposed portion of the one metal panel in which the claw portion is provided is. Therefore, it is unnecessary to further bend the claw portion against the exposed portion. Thus, the bending machining process of the claw portion can be prevented from becoming more complex.

According to the tenth aspect of the invention, basically, the fifth aspect of the same effects as in the invention can be exerted. In particular, a skeleton member formed from part of the metal panels in a protruding shape is buried within the recess, so that the protrusion is reinforced by the skeleton member. Thus, the strength and rigidity of the protrusion can be enhanced with a simple construction exploiting part of the metal panel.

According to the eleventh aspect of the invention, basically, the tenth aspect of the same effects as in the invention can be exerted. In particular, the recess and the protrusion are formed into rectangular or elliptical shape, as viewed from top. Therefore, for providing the recess and the protrusion in the coupling surfaces of the frames that are limited in width, a larger area can be ensured for the fitting portion, as compared with the case of circular recesses and protrusions, as viewed from the top, so that the coupling force between the upper exterior member and the lower exterior member can be further enhanced.

According to the twelfth aspect of the invention, basically, the tenth aspect of the same effects as in the invention can be exerted. In particular, the claw portion is formed by bending an end of the exposed portion of the one metal panel. Therefore, by integrating the pertinent metal panel with its corresponding frame prior to the bending process and by thereafter effecting the bending process, there can be eliminated any adverse effects of the presence of the bent portion of the claw portion onto the integrating process of the metal panel and the frame. Thus, this integrating process can be achieved more easily and securely.

According to the thirteenth aspect of the invention, basically, the tenth aspect of the same effects as in the invention can be exerted. In particular, the claw portion engages with the engaged portion perpendicularly to the exposed portion of the other metal panel in which the engaged portion is provided. Therefore, a more reliable engagement state can be obtained.

According to the fourteenth aspect of the invention basically, the thirteenth aspect of the same effects as in the invention can be exerted. In particular, the claw portion is located within the same plane as the exposed portion of the one metal panel in which the claw portion is provided. Therefore, it is unnecessary to further bend the claw portion against the exposed portion. Thus, the bending machining process of the claw portion can be prevented from becoming more complex.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IC card assembly structure comprising:

a frame serving as an outer frame of the IC card, said frame having an upper exterior member formed by integrating an upper frame with an upper metal panel that covers an upper side of the IC card, and a lower exterior member formed by integrating a lower frame with a lower metal panel that covers a lower side of the IC card;

an electric circuit board incorporated with said frame said upper metal panel and said lower metal panel being partly exposed at coupling portions of the upper exterior member and the lower exterior member with each other, respectively;

a claw portion provided at the exposed portion of one of the upper or lower metal panels;

an engaging portion engageable with said claw portion provided at the exposed portion of one the lower or upper metal panels, a recess formed in one of a coupling surface of the upper frame or a coupling surface of the lower frame;

a protrusion fittable with said recess and formed in the upper or lower coupling surface; and a skeleton member formed from part of the upper or lower metal panel in a protruding shape wherein said skeleton member is buried within the protrusion and supports the protrusion.

2. The IC card according to claim 1, wherein the claw portion is formed by bending an end of the exposed portion of said upper or lower metal panel.

3. The IC card according to claim 1, wherein the claw portion engages with the engaged portion perpendicularly to the exposed portion of either one of the upper or lower metal panels that includes the engaged portion.

4. The IC card according to claim 3, wherein the claw portion is located within same plane as the exposed portion of the said upper or lower metal panel that includes the claw portion.

5. The IC card according to claim 1, wherein said recess and said protrusion are formed into a rectangular or an elliptical shape, as viewed from top.

* * * * *